(12) United States Patent
Saunders et al.

(10) Patent No.: US 7,471,398 B2
(45) Date of Patent: *Dec. 30, 2008

(54) METHOD FOR MEASURING CONTOUR VARIATIONS

(75) Inventors: Ian Saunders, Amsterdam (NL); Jacobus Johannes Korpershoek, Schiedam (NL); Hedser van Brug, The Hague (NL)

(73) Assignee: Nederlandse Organisatie Voor Toegepast-Natuurwetenschappelijk Onderzoek Tno, Delft (NL)

( * ) Notice: Subject to any disclaimer, the term of this patent is extended or adjusted under 35 U.S.C. 154(b) by 79 days.

This patent is subject to a terminal disclaimer.

(21) Appl. No.: 10/527,410

(22) PCT Filed: Sep. 12, 2003

(86) PCT No.: PCT/NL03/00634

§ 371 (c)(1),
(2), (4) Date: Dec. 27, 2005

(87) PCT Pub. No.: WO2004/025216

PCT Pub. Date: Mar. 25, 2004

(65) Prior Publication Data

US 2006/0119861 A1    Jun. 8, 2006

(30) Foreign Application Priority Data

Sep. 13, 2002    (NL) .................................. 1021457

(51) Int. Cl.
*G01B 11/02*    (2006.01)
(52) U.S. Cl. .................................................. 356/512
(58) Field of Classification Search ................ 356/520, 356/503, 511–516
See application file for complete search history.

(56) References Cited

U.S. PATENT DOCUMENTS

| | | | | |
|---|---|---|---|---|
| 5,192,982 A * | 3/1993 | Lapucci | ................... | 356/520 |
| 5,426,503 A * | 6/1995 | Kusunose | ................... | 356/520 |
| 6,753,972 B1 * | 6/2004 | Hirose et al. | ................ | 356/630 |
| 7,121,922 B2 * | 10/2006 | van Brug | ................... | 451/6 |
| 2003/0155537 A1 * | 8/2003 | Machavariani et al. | . | 250/559.27 |
| 2004/0080757 A1 * | 4/2004 | Stanke et al. | ................. | 356/601 |

OTHER PUBLICATIONS

Hedser Van Brug: "Temporal phase unwrapping and its application in shearography systems" Applied Optics, vol. 37, No. 28, Oct. 1, 1998, pp. 6701-6706, XP002244333 cited in the applications p. 6705; figures 6,7.

Patent Abstracts of Japan, vol. 017, No. 132 (P-1504), Mar. 18, 1993 - & JP 04 310847 A (Olympus Optical Co LTD), Nov. 2, 1992 abstract; figure 2.

* cited by examiner

*Primary Examiner*—Gregory J Toatley, Jr.
*Assistant Examiner*—Jonathan M Hansen
(74) *Attorney, Agent, or Firm*—Young & Thompson (57) ABSTRACT

A method for measuring a contour variation of a measuring area on an object. The method includes the steps of: irradiating the measuring area with a light beam, wherein reflection or transmission of the beam occurs; splitting the transmitted or reflected beam; combining the split beams with each other and observing a fringe pattern representing a differential phase between the split beams; varying the phase of the split beams relative to each other, such that the differential phase is kept within the range of 2 pi; calculating an optical path length difference from the differential phase; and relating the optical path length difference to the contour variation of the object.

20 Claims, 5 Drawing Sheets

METHOD FOR MEASURING CONTOUR VARIATIONS

The invention relates to a method and apparatus for measuring a contour variation of a measuring area on an object.

A known method for analyzing a contour of a measuring object is to carry out a fringe measurement, in which the object is, for instance, irradiated from a flat reference plate and optical path length differences caused by contour variations in the object result in a fringe pattern, with, each time, the contrast lines in the patterns indicating phase transitions of 2 pi in the pattern. The analysis of such patterns is known and, for instance, described in German patent application DE 198 55 455. Although such an analysis technique can work in vibration-free situations where the contour variations are not extreme, in practice, there appears to be a need for an improved measuring technique to measure contours. This need especially arises in machining techniques of optical elements such as lenses or mirrors, where, for high-performance optics in photolithography, telescopy and microscopy, an extremely high accuracy is required in determining the contours. Such machining operations are often used for polishing surfaces of optical components, such as refractive optical components, for instance lenses or windowpanes from glass, quartz or BK7, and reflective optical components such as mirrors, from metal or ceramics. Known methods for polishing, in addition to grinding with a grinding template and grinding paste, are other, generally material-removing, techniques such as SPDT (single point diamond turning), CCP (computer controlled polishing), MRF (magneto-rheologic finishing), FJP (fluid jet polishing) and EEM (Elastic Emission Machining), IBF (Ion Beam Figuring) and IBP (Ion Beam Polishing).

Besides for above-described vibration-sensitive arrangements, the known techniques also fail in sturdiness, if the contour to be measured shows too strong variations. Then, the fringe patterns measured become so low in resolution, that measurements on them do no longer produce reliable information about the contour.

It is an object of the invention to obviate the above-mentioned disadvantages and to provide an improved method for measuring a contour variation of a measuring area on an object.

This object is achieved by a method of above-mentioned type, comprising the steps of:
irradiating the measuring area with a light beam, while reflection or transmission of the beam occurs;
splitting the transmitted or reflected beam;
varying the phase of the split beams relative to each other such that the differential phase is kept within the range of 2 pi;
combining the split beams with each other and observing a fringe pattern indicating a differential phase between the split beams;
calculating an optical path length difference from the differential phase; and
relating the optical path length difference to the contour variation of the object.

The method according to the invention has as an advantage that the phase information which is contained in a reflected or transmitted beam can be withdrawn therefrom without a separate auxiliary optic being required for generating a reference beam at the location of the measuring area. This means, that by analyzing the fringe patterns of a recombined beam, the phase change of the beam as a result of a contour variation can be determined in a low-vibration environment which is hardly troubled by interfering external factors resulting from machining steps or other influences at the location of the measuring area, because these factors are equally incorporated in both beams and are eliminated upon phase subtraction. As a result, environmental disturbances have less influence on the measurements. Thus, in a simpler manner, measurements of higher quality can be carried out.

The technique utilizes the temporal phase unwrapping technique (TPU), as described, for example, in H. van Brug, "Temporal phase unwrapping and its application in shearography systems", Appl. Opt. 37 (28), pp. 6701-6706, 1998. This technique enables keeping the phase image time-resolved by carrying out incremental phase measurements which, each time, correspond to a phase change which is in the range of 2 pi, and by adding these up over time.

In a preferred embodiment, the phase of the split beams is varied by carrying out a relative movement of the beam and the measuring area such that the form of the measuring area changes. Through a changing form of the measuring area, the phase image in the beam changes. By detecting the phase change according to the method of the invention, by means of a scanning movement, for instance by fixing the object and having the beam carry out a scanning movement and/or, conversely, by fixing the light beam and carrying out a small displacement of the object, a phase change in the beam can be realized which can register, each time, from a zero position, the contour variations relative to that zero position. By keeping, each time, via TPU, the phase time-resolved, by carrying out the scan, the geometry of the object can be analyzed over an arbitrarily large scanning surface.

In addition to or as an alternative for the above-mentioned embodiment, it is possible to measure a changing form in a fixed measuring area, for instance in the case that the form of the measuring area changes under the influence of a material-adding or material-removing operation. This embodiment is especially useful in operations of the above-described type, in which, during the operation, an accurate monitoring of the adding and removing operations needs to take place.

In a further embodiment, the phase can be varied by placing an optical phase filter in one of the split beams for generating a predetermined phase plane. This phase filter can be a pin hole the size of the diffraction spot, so that the phase plane is a zero front. Naturally, this zero front can be modified by a hologram or by a different phase optic, for obtaining a fringe pattern having an acceptable resolution which corresponds to a particular contour. For instance, in an embodiment a zero front can be formed with a phase optic, which, by means of the fringe patterns can be adjusted for exactly zero so as to detect a desired, predetermined contour. The pin hole allows a small fraction of the beam through on an optical axis. As a result, a point-shaped light source is simulated having a virtually flat phase front. Through the phase filter therefore, a zero phase beam is delivered, carrying in itself exactly the disturbances and path length differences which are introduced by the optic. These disturbances are eliminated upon interference with the reflection or transmission beam, so that, accurately, a phase disturbance can be detected which is caused by optical path length variations resulting from a contour variation.

In a preferred embodiment, the beam has a diameter such that at least two positions varying in height in a measuring area are exposed; the method comprising the further step of: shifting the measuring beam relative to itself along the connecting line between the above-mentioned positions so that a differential phase between the shifted beams lies within a range of 2 pi; and, through integration of the differential phase, calculating an optical path length difference related to the contour variation of the object. It is noted that the shifting technique per se is known to the skilled person as "shearing".

In an advantageous embodiment of this application of shearing, the method comprises the step of rotating a split beam by means of a rotating mirror; projecting the split beams on a lens, which beams, as a result of the rotation, run at an angle relative to each other; and observing a fringe pattern in a focal plane of the lens as a result of a shift of the beams which corresponds to the angular displacement of the rotating mirror. By carrying out the rotation of the mirror in a controlled manner, a fringe pattern is formed which corresponds to a first order derivative of the phase shift. By examining the phase angle, this first order can be resolved to a phase image which, with reference to above-mentioned embodiments, can be related to a contour variation of the object. By adjusting the shearing to a detected slope, each time, with a maximum resolution, an incremental phase variation can de detected, so that the method has a relatively large sensitivity.

Preferably, the measuring beam is then a parallel light beam having a relatively small diameter, while the measuring area has a dimension which is smaller than the diameter of the measuring beam.

In an alternative embodiment, the reflected measuring beam can be a diffuse light beam. In one variant, the measuring beam can be a homogeneous, parallel light beam, while the measuring surface is provided with a mat layer, such that the reflected beam is a diffuse light beam. In a different variant, the measuring beam can be reflected on a smooth surface, while the measuring beam is a diffuse light beam. What is meant by a diffuse beam is a beam with a virtually random distribution of directions within a predetermined range of directions. Such a range can have one central main direction, in particular a direction towards the observation optic. The use of such diffuse light sources is known to the skilled person as a speckle technique. In the framework of the invention, this technique offers the advantage that relatively larger surfaces with relatively large form variations can be analyzed. In particular, by incremental measuring of the phase, an image is obtained in which the random distribution has disappeared, because the phase difference image, as is the case with a normal, homogeneous beam, is exclusively related to the phase variation resulting from the contour variation.

The invention further relates to an apparatus for measuring a contour variation of a measuring area on an object. The apparatus according to the invention comprises a light source for providing a light beam for irradiating a measuring area; a holder for positioning the object relative to the light source; a beam-splitting member for splitting the transmitted or reflected beam; a phase-influencing member for setting a phase difference between the split beams; a beam-combining member for combining the split beams; an observation member for observing a fringe pattern indicating a differential phase between the split beams; and a processor for calculating an optic path length difference from the differential phase and for relating the optical path length difference to the contour variation of the object.

The invention will now be further elucidated with reference to the Figures, in which.

In the Figures, identical parts are designated by identical reference numerals.

Figure 1:
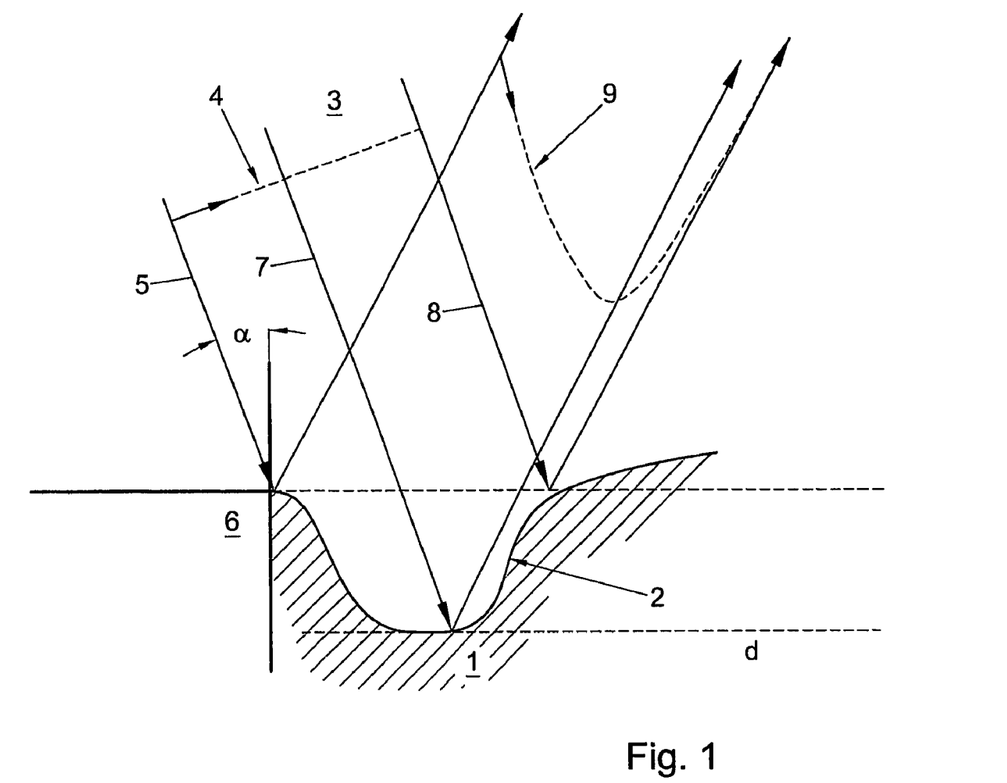
FIG. 1 shows a schematic set-up of a measuring beam scanning a contour variation.

With reference to FIG. 1, a basic set-up is now given of an object, such as, for instance, a reflective object 1 as an optical element, such as a lens, having a particular contour 2 which is measured with the aid of a scanning beam 3. Preferably, the scanning beam 3 is a coherent light beam, which, for reflection on the object 1, has a fixed phase front 4, for convenience's sake considered to be flat. It will appear, for that matter, that in certain cases as will be described with reference to FIG. 7, also for a non-flat phase front, the contour of the surface can be reduced from the phase image of the beam. In FIG. 1, with a first light beam 5, a light path of a beam is represented which reflects on a point of the object located at a first height. In the Figure, this height is represented by the zero height in a coordinate system 6 depicted in bold lines. Further, with a second light beam 7, a light path of a beam is represented which reflects on a point of the object located at a second height, at a distance d from the first point. Finally, for completeness's sake, a third light path 8 of a beam is represented, which, again, reflects on a position located at the zero height. From FIG. 1 it is clear that the different light beams which, in beam 3, irradiate a surface 2, realize, due to the contour variation of the object 1, a phase variation in the beam, which is related to that contour variation by the equation:

$$\Delta\phi = \frac{2\pi}{\lambda} \cdot 2d\cos\alpha \qquad (1)$$

whereby $\Delta\phi$ is the phase variation relative to the zero phase (represented by the hatched line 9), $\lambda$ is the light wavelength used; $\alpha$ is the angle at which measurements are taken relative to a normal line, and d represents the contour variation.

Figure 2:
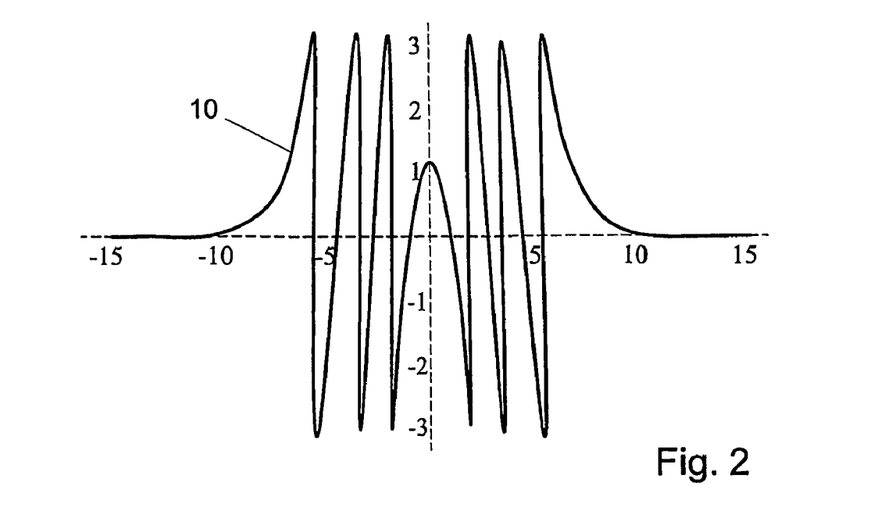
FIG. 2 shows a representation of a phase image as can be derived from a fringe pattern.

With reference to FIG. 2, it can now be understood how a similar phase pattern 10 (in this case of a symmetrical disturbance) is observed, if the reflected beam is combined with a zero phase beam. (This interference will be discussed further with reference to FIG. 7). As phase displacements, by nature, can only be observed modulo $2\pi$, without the use of the TPU technique, a phase image is formed having a large number of discontinuities on the $2\pi$-transitions. It will be clear that such transitions are very difficult to identify in practical measuring results, so that the "unwrapping" of a measured phase diagram 10 into a "real" phase image which corresponds to a phase variation resulting from a contour variation, for instance, as with reference to 9 represented in FIG. 1, is highly dependent on interference in the measured image and the number of phase jumps.

Figure 3:
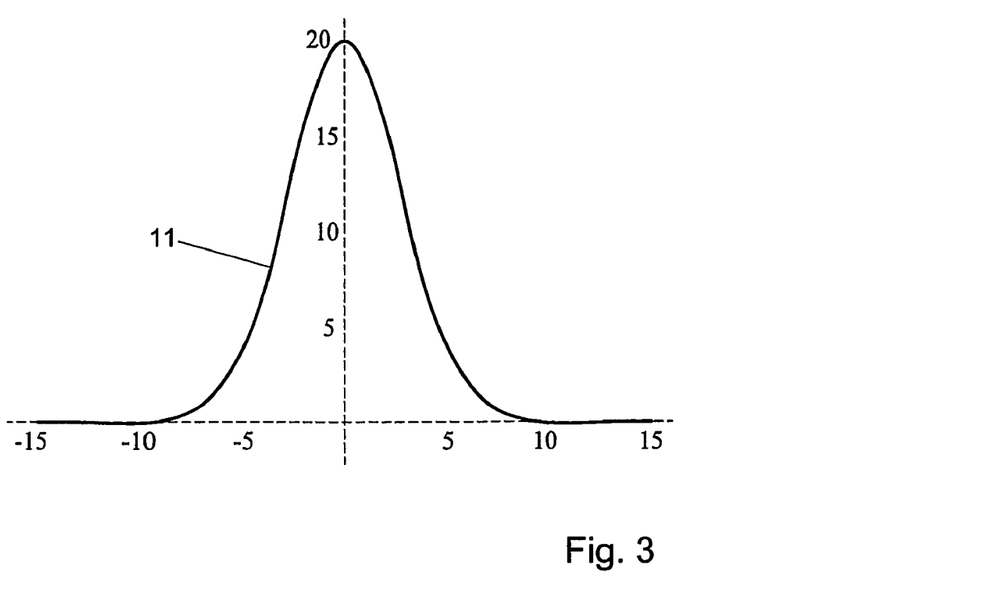
FIG. 3 shows a representation of a resolved phase according to the TPU-technique.

FIG. 3 represents how such a phase image in "unwrapped condition" can be determined with the TPU technique. In essence, this technique amounts to limiting locally or temporally measured phase variations within a range of 2 pi, so that, effectively, no phase jumps can occur. This can be achieved by having the changes in the surface between two measurements to be sufficiently small, through the measurements following each other rapidly, through the decrease proceeding sufficiently slowly or through the applied change in the measuring system being sufficiently small.

As a result, by fixing a local or temporal phase variation with respect to a zero phase, a starting point can be chosen for measuring a next phase. In this manner, a phase image 11 remains time and place-resolved, without phase jumps occurring in the measurements. In the Figure, this amounts to scanning the contour in the direction of the arrow traveling along the phase plane, while, each time, a phase variation is determined lying within the range of 2π. The detected phase variation is chosen as starting point for carrying out a next determination. The phase increase is added up for each position over time, so that the total of the phase variation remains inherently resolved.

An embodiment for calculating the phase changes can consist of registering at each moment phase-stepped images for calculating the phase, followed by subtracting the phase distribution for two consecutive images.

For resolving the phase, therefore, minimally three phase-stepped images per instance need to be used; as three unknown quantities determine the phase-stepped images: the background intensity, the modulation intensity and the phase.

Another approach can be the combining of mutually split beams, while a second light beam is retarded relative to a first beam by a quarter wave length. The images thus obtained can, after for instance software-wise mirroring, be directly subtracted from each other to determine the change of the phase difference between the interfering beams of consecutive measurements.

For this approach, a minimum of four phase-stepped images is required:

Thus, for each time t the phase-stepped images are registered:

$$I_0(t) = I_B + I_M \cos(\phi(t)) \quad (2)$$

$$I_{\pi/2}(t) = I_B - I_M \sin(\phi(t)) \quad (3)$$

Here, $I_B$ and $I_M$ are the background and modulation intensity, respectively. The quantity $\phi(t)$ indicates the phase difference between the object and a reference phase. The phase change can be obtained between two successive takes t and t+T by $$\Delta\phi(t+T, t) = -\frac{\pi}{2} - 2\arctan\left(\frac{I_0(t) - I_{\pi/2}(t+T)}{I_{\pi/2}(t) - I_0(t+T)}\right) \quad (4)$$

whereby the subscript 0 and π/2 indicates the phase step between two interfering beams. The registered phase changes can be added via $$\Delta\Phi = \sum_i \Delta\phi(\{i+1\}T, iT)$$

Note that the phase represented in FIG. 3 has a range of 20, therefore virtually 7π. It will be clear that this phase image cannot be directly observed but can only be calculated by means of resolving by, for instance, TPU.

Figure 4:
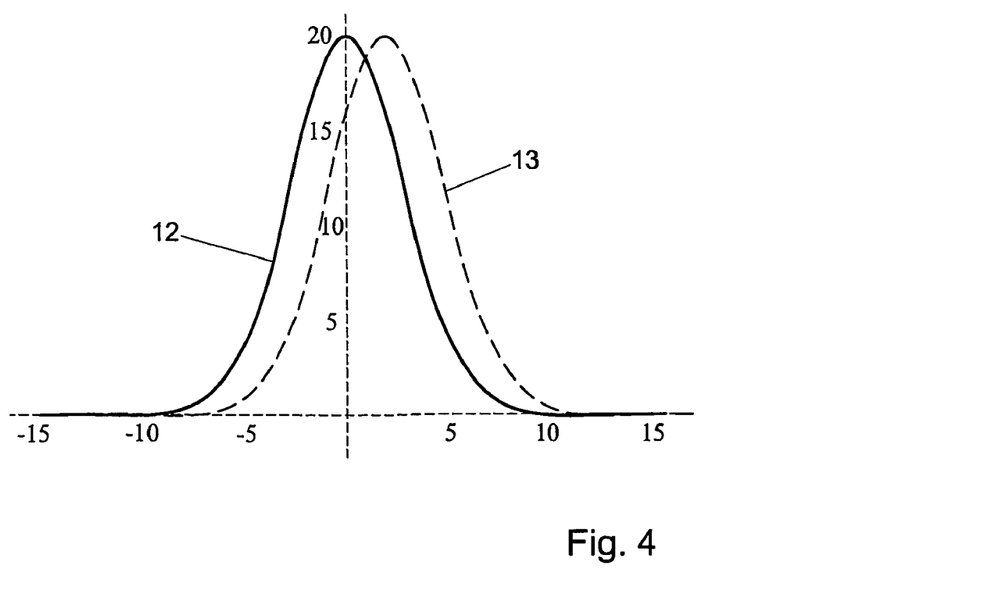
FIG. 4 shows a schematic representation of the phase images of two beams shifted slightly relative to each other.
Figure 5:
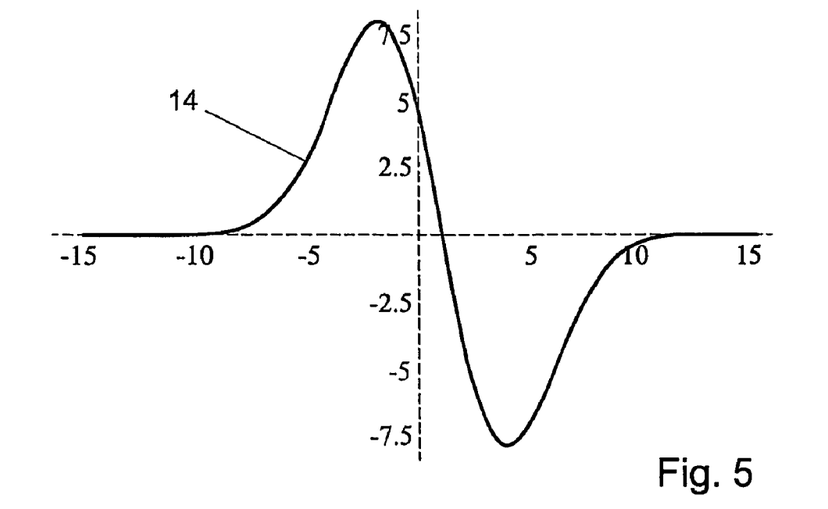
FIG. 5 shows a schematic representation of a combined phase image as can be derived from a fringe pattern.

In FIG. 4, an imaginary representation is shown of the phase pattern of a measuring beam shifted slightly relative to itself, for instance with a contour variation 11 as represented in FIG. 3, represented by a continuous line 12 and a broken line 13. This technique is well known to the skilled person as shearing or shifting. Now, the beam is not combined with a zero phase beam, as is further elucidated with reference to FIG. 8, so that a contour as for instance the contour 11 in FIG. 3 can be obtained, but with a shifted version of the reflection beam. When these beams are combined, on a detection plane of for instance a camera a fringe pattern is observed representing the differential phase between the beams, as is the case with interference with a zero phase beam as described with reference to FIG. 3. The differential phase can be expressed as the mathematic derivative of the phase contour. By shifting the phase such that the differential phase is kept within a range of 2π, this differential phase can be resolved by means of TPU, which results in a phase contour 14 as represented with reference to FIG. 5. It is true that the positive left hand part of the phase contour of FIG. 5 represents the part where the continuous line 12 of FIG. 4 runs above the interrupted line 13 of the shifted beam; the negative part gives the right hand part where the continuous line 12 runs below the interrupted line 13. To obtain the real phase contour, as it runs as the continuous line 12 or interrupted line 13 of FIG. 4, the phase obtained by means of TPU has to be integrated in the direction of the shearing. If the invention is used in a material-adding or material-removing operation, i.e. in the case a contour varies locally, it is advantageous to start the integration from a zone in which no changes have occurred; this zone then serves as reference zone and contour variations can unequivocally be determined on such a fixed reference. If such a reference zone is not available, the variation can only locally be identified and the contour is determined except for one constant. The degree of shearing is determined by the slope of the contour variation; if a considerable slope is detected, the shearing has to be relatively limited for unambiguously resolving the phase, conversely, if a relatively small slope is detected, the shearing can be considerable. By adjusting the shearing to a detected slope, each time, with a maximum resolution, an incremental phase variation can de detected, so that the method has a relatively large sensitivity.

Figure 6:
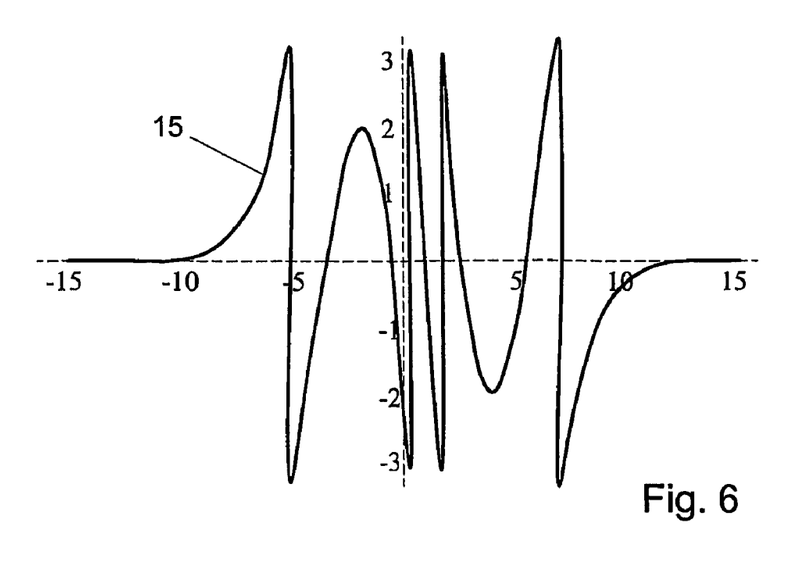
FIG. 6 shows a schematic representation of the phase image without the phase being time-resolved.

Finally, FIG. 6 demonstrates a differential phase image 15 as it is measured without keeping the phase time-resolved, i.e. if phase changes greater than 2 pi occur. It is clear, in particular for practical set-ups which are subject to inherent system inaccuracies and interferences, that such dimensions are difficultly reducible to a phase diagram are represented in FIG. 4.

Figure 7:
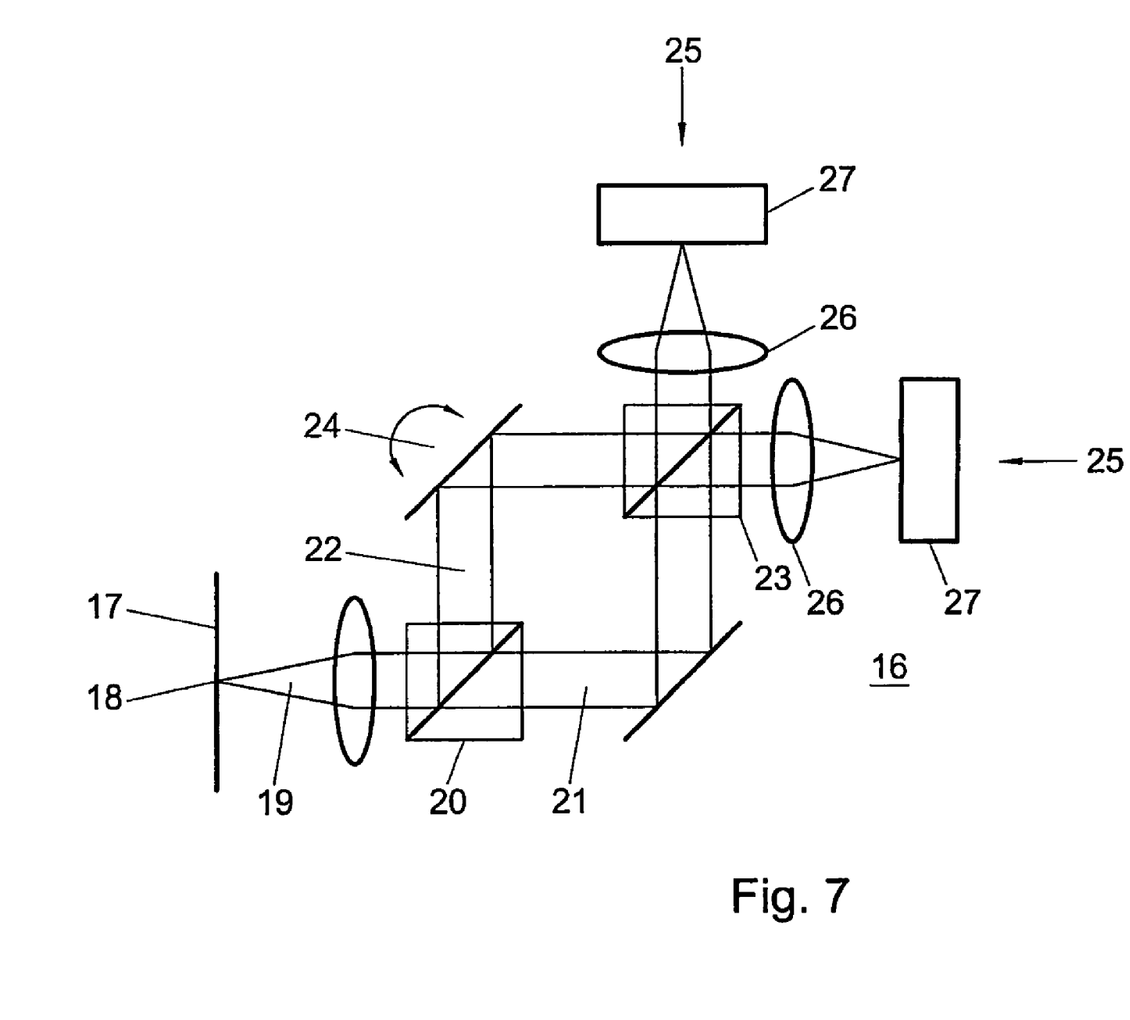
FIG. 7 shows a first set-up according to the invention for measuring a contour variation.

FIG. 7 shows a first set-up of an apparatus according to the invention, wherein use is made of a device for measuring a contour variation of a measuring area on an object. The device 16 of FIG. 7 comprises a light source (not represented) irradiating a measuring area 17, while from a position 18 a reflection beam 19 is generated. The measuring area is schematically represented and forms part of a contour of an object, which is positioned by a holder (not shown) relative to the light source and the measuring optic 16. The measuring optic comprises a semi-transparent mirror 20 disposed at an angle, for splitting the reflected beam 19. Therefore, the mirror 20 generates two mutually split beams 21 and 22, perpendicular to each other. The beams 21 and 22 travel a separate optical path through the measuring optic 16 before they are combined in a second semi-transparent mirror 23. Due to a rotatable mirror 24, the mutual angle of beam 22 is adjustable relative to the mirror 23. As a result, beam 22 is projected on mirror 23 at an angle displaced as a result of rotation. The semi-transparent mirror 23 projects the beam in two branches 25, each provided with a lens 26 and a camera 27. By means of phase members (not shown), the branches are retarded relative to each other so that, as is explained hereinabove with reference to equations 2)-3), two phase-stepped images are observed which are rotated in phase 90° relative to each other. The cameras 27 are both connected to a processor (not shown)

which, by subtracting both images, can directly determine a phase increment according to equation 4. As beam 22 is projected on the lenses 26 as a result of the angular displacement, a camera 27 arranged in the focal plane of the lens 26 observes a fringe pattern resulting from a shift of the beams 21, 22, which corresponds to the angular displacement of the rotating mirror. Thereupon, the processor calculates from equation 1 an optic path length difference and for relating the optic path length difference to the contour variation of the object.

Figure 8:
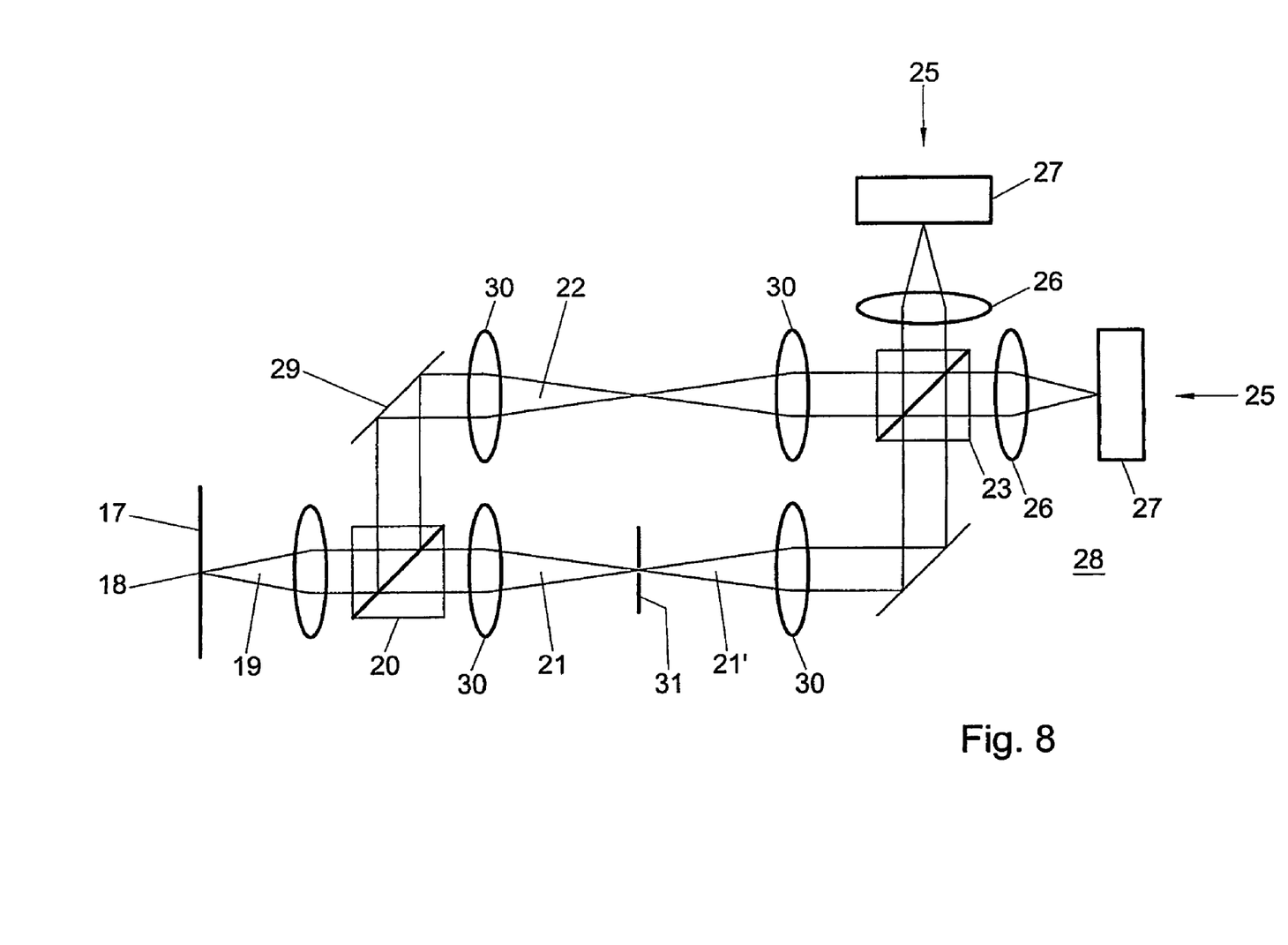
FIG. 8 shows a second set-up according to the invention for measuring a contour variation.

FIG. 8 shows a second set-up according to the invention, wherein use is also made of a device for measuring a contour variation of a measuring area on an object. As in FIG. 7, the device 28 of FIG. 8 comprises a light source (not shown) irradiating a measuring area 17 while a reflection beam 19 is generated.

As in the set-up of FIG. 7, the measuring optic 28 comprises a semi-transparent mirror 20 disposed at an angle, for splitting the reflected beam 19. Therefore, the mirror 20 generates two mutually split beams 21 and 22 perpendicular to each other. The beams 21 and 22 travel a separate optical path through the measuring optic 28, before they are combined in a second semi-transparent mirror 23. However, the rotatable mirror 24 of FIG. 7 is now replaced by a stationary mirror 29, which has the split beam 22 run parallel to the continuous beam 21. The split beam is projected directly onto the semi-transparent mirror 23, which projects the beam in two branches 25, each of which is also provided with a lens 26 and a camera 27. The branches are further designed as set forth with reference to FIG. 7. Instead of, as was the case with FIG. 7, combining the beam with a shifted version of itself, now, in one of the split beams 21, an optical phase-filter is disposed. This phase filter comprises a pin hole 31 arranged between two lenses 30 which only allows a small fraction of the beam to pass. As a result, a point-shaped light source is simulated with a virtually flat phase front. Therefore, by this phase filter, a zero phase beam is given off, further carrying in itself exactly the disturbances and path length differences which are introduced by the optic in the split version. To increase the symmetry, in the split beam 22 an identical lens arrangement 30 can also be disposed. By combining the zero phase beam 21' and the split beam 22, a fringe image is created from which, as is set forth with reference to FIGS. 2 and 3, a phase variation can be derived which can be related to the contour variation of the measuring area 17.

Although the invention has been discussed with reference to the exemplary embodiments represented in the drawing, it is not limited thereto but can comprise all sorts of variations and modifications thereof. For instance, in contrast to the exemplary embodiments described, it is very well possible to analyze a transmission beam in optical transmissive objects. This can even be an advantage if the upper side of the object is difficultly accessible, for instance, as a material-adding or material-removing operation is carried out. Further, the phase variation can be analyzed with the aid of diffuse light beams, because the technique only utilizes a differential phase measurement. The real phase may therefore yield an image which is "wild" and difficult to analyze, as long as the differential images possess sufficient resolution. By utilizing diffuse light beams, for instance, by irradiating an object to be analyzed with a diffuse beam or by irradiating it with a relatively coherent beam, but whereby the object is provided with a mat layer, at a relatively limited observation angle, a phase image and associated phase variation can be observed carrying information in it about a relatively large surface with relatively great contour variations. These diffusion beam techniques or speckle techniques therefore appear to be very favorable for the analysis of relatively large measuring areas with relatively great contour variations.

Such variations are understood to be within the scope of the invention as defined in the following claims.

The invention claimed is:

1. A controlled material adding or removing method for shaping a contour of an object, comprising the steps of, during material addition or removal:

irradiating a measuring area of the object that changes under the influence of the material addition or removal, with a light beam, while reflection or transmission of the beam occurs;

splitting the transmitted or reflected beam;

varying the phase of the split beams relative to each other, such that the differential phase is kept within the range of 2 pi;

combining the split beams with each other and observing a fringe pattern which represents a differential phase between the split beams;

calculating an optical path length difference from the differential phase; and relating the optical path length difference to the contour variation of the object, wherein the phase is varied by placing, in only one of said split beams, an optical phase filter for generating a predetermined phase plane.

2. A method according to claim 1, characterized in that the phase of the split beams is varied by carrying out a relative movement of the beam and the measuring area such that the form of the measuring area changes.

3. A method according to claim 1, characterized in that the method is repeatedly used for measuring phase changes greater than 2 pi.

4. A method according to claim 1, characterized in that the phase filter is a pin hole the size of the diffraction spot, so that the phase plane is a zero front.

5. A method according to claim 1, characterized in that the beam has a diameter such that at least two positions, varying in height in a measuring area arm exposed; which method comprises the steps of:

shifting the measuring beam relative to itself along the connecting line between said positions so that a differential phase between the shifted beams lies within a range of 2 pi; and calculating, by integrating the differential phase, an optical path length difference related to the contour variations of the object.

6. A method according to claim 5, characterized in that the method comprises the step of displacing a split beam by means of a rotating mirror; projecting the split beams on a lens, which beams, as a result of the displacement, run at an angle relative to each other; and observing, in a focal plane of the lens, a fringe pattern resulting from a shift of the beams which corresponds to the angular displacement of the rotating mirror.

7. A method according to claim 6, characterized in that the degree of shearing is determined by the slope of the contour variation.

8. A method according to claim 1, characterized in that the measuring beam is a parallel light beam of a relatively small diameter, wherein the measuring area possesses a dimension smaller than the diameter of the measuring beam.

9. A method according to claim 1, characterized in that the reflected measuring beam is a diffuse light beam.

10. A method according to claim 9, characterized in that the measuring beam is a homogenous, parallel light beam, herein the measuring surface is provided with a mat layer, such that the reflected beam is a diffuse light beam.

11. A method according to claim 9, characterized in that the measuring beam is reflected on a smooth surface, wherein the measuring beam is a diffuse light beam.

12. A material adding or removing apparatus for shaping a contour of an object, comprising:
- a material adding or material-removing system; and
- a measurement system for measuring a variation of a measuring area, the measurement system comprising:
    - a light source for providing a light beam for irradiating a measuring area of the object that changes under influence of the material addition or removal;
    - a holder for positioning the object relative to the light source;
    - a beam splitting member for splitting a transmitted or reflected beam from the measuring area;
    - a phase influencing member for setting a phase difference between the split beams;
    - a beam combining member for combining the split beams;
    - an observation member for observing a fringe pattern representing a differential phase between the split beams; and
    - a processor for calculating an optical path length difference from the differential phase and for relating the optical path length difference to the contour variation of the object,
    - wherein, in only one of said split beams, the phase influencing member comprises an optical phase filter for generating a predetermined phase plane.

13. An apparatus according to clam 12, characterized in that the holder is adapted for carrying out a relative movement of the beam and the object.

14. An apparatus according to claim 12, characterized in that the phase filter is a pin hole, so that the phase plane is a zero front.

15. An apparatus according to claim 12, characterized in that the beam possesses such a diameter that at least two positions varying in height in a measuring area are exposed; wherein the phase influencing member comprises means for shifting the measuring beam relative to itself in an adjustable manner along the connecting line between said positions.

16. An apparatus according to claim 12, characterized in that the phase-influencing member comprises a rotating mirror for displacing the split beam at an angle, wherein the beam-combining member combines the split beams and projects them, mutually running at an angle, on a lens, wherein the observation member is arranged in a focal plane or the lens, so that a fringe pattern is observed resulting from a shifting of the beams corresponding to the angular displacement of the rotating mirror.

17. An apparatus according to claim 12, characterized in that the measuring beam is a parallel light beam of a relatively small diameter, wherein the measuring area possesses a dimension smaller than the diameter of the measuring beam.

18. An apparatus according to claim 12, characterized in that the reflected measuring beam is a diffuse light beam.

19. An apparatus according to claim 12, characterized in that the measuring beam is a hamogenous, parallel light beam, wherein the measuring surface is provided with a mat layer, such that the reflected beam is a diffuse light beam.

20. An apparatus according to claim 12, characterized in that the measuring beam is reflected on a smooth surface, wherein the measuring beam is a diffuse light beam.

* * * * *